United States Patent Office 2,932,641
Patented Apr. 12, 1960

2,932,641

α,β-BUTENOLIDES OF THE PREGNENE, PREGNANE AND ALLOPREGNANE SERIES AND A PROCESS FOR PREPARING THEM

Heinrich Ruschig, Bad Soden (Taunus), and Werner Fritsch and Ernst Lindner, Frankfurt am Main, Germany, assignors to Farbwerke Hoechst Aktiengesellschaft vormals Meister Lucius & Brüning, Frankfurt am Main, Germany, a corporation of Germany No Drawing. Application July 24, 1957
Serial No. 673,757

Claims priority, application Germany July 26, 1956

7 Claims. (Cl. 260—239.57)

It is known that the aglycones of most vegetable cardiotoxic substances as a general rule contain an α,β-unsaturated lactone grouping at the 17-carbon atom of the sterol structure as shown by the following Formula I

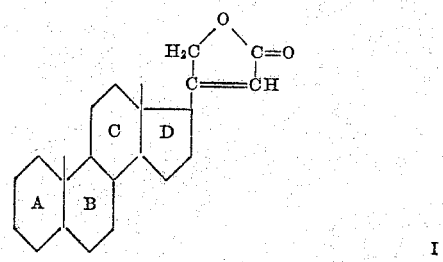

I

Although success has been attained (cf. for example Ruzicka, Reichstein & Fürst, Hel. Chim. Acta 24 (1941), 76, Torrey, Kuck and Elderfield, J. Org. Chem. 6 (1941), 289) in synthesizing several steroids with the α,β-unsaturated lactone grouping of structural Formula I, it was not possible to obtain physiologically, i.e. cardiovascularly effective substances (cf. Fieser and Fieser, Natural Products related to Phenanthrene, 3rd ed. (1949), page 559, line 7 from below, furthermore Burger, Medicinal Chemistry, vol. I. (1951), page 231, lines 3/4 from above).

The present invention relates to α,β-butenolides of the pregnene, pregnane and allopregnane series of the formula

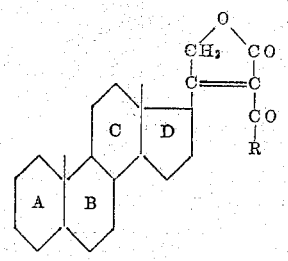

wherein R represents hydroxy or an alkyl, aryl, aralkyl, hydroxalkyl, carboxyalkyl or amino group. These compounds show a considerable cardiovascular effect, especially such compounds in which R stands for an alkyl group containing at most 3 carbon atoms.

Further, we have found that α,β-butenolides of the formula given above wherein R represents hydroxy or an alkyl, aryl, aralkyl, hydroxyalkyl, carboxyalkyl or amino group can be obtained simply, in good yield and on an industrial scale by esterifying in known manner the hydroxy group in the $C_{21}$-position of 20-keto, 21-hydroxy-derivatives of the pregnene, pregnane, and allopregnane series with acids of the general formula

HOOC—$CH_2$—CO—R in which R represents the hydroxyl group or an alkyl, aryl, aralkyl, hydroxyalkyl, carboxyalkyl or amino group, or with their reactive derivatives and condensing the esters obtained with basic condensing agents.

The reaction is performed, for example, according to the following scheme:

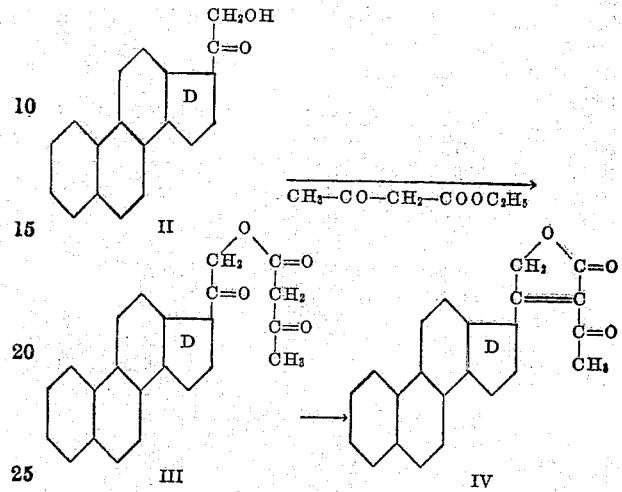

As starting compounds there come into consideration 20-keto, 21-hydroxy-derivatives of the pregnene, pregnane, and allopregnane series containing further substituents such as hydroxyl and/or keto groups, for example $\Delta^4$-pregnene-dione-(3,20)-ol-(21),
allopregnane-dione-(3,20)-ol-(21),
$\Delta^5$-pregnene-one-(20)-diol-(3,21),
pregnane-one-(20)-diol-(3,21),
allo-pregnane-one(20)-diol-(3,21),
$\Delta^4$-pregnene-trione-(3,11,20)-diol-(17α,21),
$\Delta^4$-pregnene-dione-(3,20)-triol-(11,17α,21),
$\Delta^{1,4}$-pregnadiene-trione-(3,11,20)-diol-(17α,21),
$\Delta^{1,4}$-pregnadiene-dione-(3,20)-triol-(11,17α,21),
pregnane-trione-(3,11,20)-diol-(17α,21),
pregnane-dione-(3,20)-triol-(11,17α,21),
allo-pregnane-trione-(3,11,20)-diol-(17α,21),
allo-pregnane-dione-(3,20)-triol-(11,17α,21),
$\Delta^4$-pregnene-dione-(3,20)-diol-(17α,21),
$\Delta^5$-pregnene-one-(20)-triol-(3,17α,21),
pregnane-dione-(3,20)-diol-(17α,21),
allo-pregnane-dione-(3,20)-diol-(17α,21),
pregnane-one-(20)-triol-(3,17α,21),
allopregnane-one-(20)-triol-(3,17α,21),
$\Delta^4$-pregnene-trione-(3,11,20)-ol-(21),
$\Delta^5$-pregnene-dione-(11,20)-diol-(3,21),
$\Delta^4$-pregnene-dione-3,20)-diol-(11,21),
pregnane-trione-(3,11,20)-ol-(21),
allo-pregnane-trione-(3,11,20)-ol-(21),
pregnane-dione-(11,20)-diol-(3,21),
allo-pregnane-dione-(11,20)-diol-(3,21),
pregnane-dione-(3,20)-diol-(11,21),
allo-pregnane-dione-(3,20)-diol-(11,21).

Besides being present in the 3-, 11- or 17-position of the sterol skeleton, hydroxyl groups can also be present in the 5- and/or 14-position of 21-hydroxy-20-ketosteroids.

As acids according to the general formula indicated above compounds having an active methylene group in α-position to the carboxyl group are generally suitable. The radicals linked to the methylene group must be able to activate hydrogen atoms of the methylene group. In the above formula R may stand for hydroxyl, alkyl, aryl, aralkyl, hydroxyalkyl, carboxyalkyl and amino. The alkyl radicals may be of straight or branched chain and may contain further substituents such as halogen atoms and hydroxyl groups. Acids with low molecular weight alkyl groups are preferably used, but there can also be used acids with high molecular weight radicals. As alkyl radicals there may be mentioned: methyl, ethyl, propyl, butyl radicals and the like. As aryl radical there is preferably used the phenyl radical, as aralkyl radical preferably the benzyl radical. For the alkyl groups contained in the hydroxy-alkyl or carboxalkyl groups the definition given above likewise applies. As examples of such acids there are mentioned aceto-acetic acid, malonic acid, acetone dicarboxylic acid, oxalacetic acid, butyryl-acetic acid and benzoyl-acetic acid. Instead of the free acid the corresponding ethanol esters or also the acid amides, anhydrides, halides, azides and other functional derivatives are used.

The esterification to be carried out in the first stage is effected in the usual manner, for example by reesterification, condensing the steroid alcohol with acid chlorides or acid anhydrides in the presence or absence of tertiary organic bases or with diketene.

The ring closure occurring in the second stage and forming the lactone constitutes a particular reaction hitherto unknown. In view of the complicated steric conditions and the possible substituents or unsaturated bonds, it was surprising to those skilled in the art that the reaction was successful and took a smooth course. The ring closure is effected by the action of basic condensing agents; metal alcoholates, metal hydroxides and metal oxides being preferred. It is favorable to operate in the presence of organic solvents, such as alcohols or mixtures of alcohols and water. The reaction may take place at room temperature or at an elevated temperature. The most favorable temperatures are within the range of 20° and 100° C. The reaction may be carried out in such a maner that the steroid ester, for instance in an alcoholic solution or suspension, is added to a solution or suspension of the condensing agent. Conversely, it is also possible to stir the condensing agent into a solution or suspension of the steroid ester. The reaction mixture can be heated to boiling with or without reflux. However, it also suffices to allow it to stand at low temperatures. In some cases the ring closure takes place when the ester is contacted with aluminum oxide (for instance when subjecting the ester to chromatographic adsorption by aluminum oxide).

The ring closure is not affected by substituents or double bonds in the sterol skeleton. Further hydroxyl or amino groups present are simultaneously esterified or amidated when preparing the esters. However, when these groups are not saponified during the ring closure to the lactone they can be hydrolyzed later on, without the unsaturated lactone ring being altered.

The process of the present invention relates to a preparation, on an industrial scale and in a smooth reaction, of steroids which contain an $\alpha,\beta$-unsaturated butenolide group at the 17-carbon atom of the steroid skeleton and which, in contradistinction to the hitherto synthesized steroid butenolides not substituted in $\alpha$-position, show a considerable cardiovascular effect equivalent to that of the natural digitalis glucosides and digitaloids. For example, the $\Delta^4$-androstene-one-(3)-$\Delta,\alpha,\beta(\alpha$-acetyl)-butenolide-(17) at the isolated atrium of the heart of rabbits and guinea-pigs in a dilution of 5–10$\gamma$/40 cc. of tyrode-solution shows a positive inotropic effect. The frequency is not changed or it is slightly reduced. Digitoxin is of equal effect in a dilution of 5$\gamma$/40 cc.

The toxicity of $\Delta^4$-androstene-one-(3)-$\Delta,\alpha,\beta$-($\alpha$-acetyl)-butenolide-(17) is lower than that of digitoxin.

The following examples serve to illustrate the invention but they are not intended to limit it thereto:

EXAMPLE 1

$\Delta^4$-androstene-one-(3)-$\Delta,\alpha,\beta$-($\alpha$-acetyl)-butenolide-(17)

0.5 cc. of triethylamine are added to a solution of 3 grams of $\Delta^4$-pregnene-dione-(3,20)-ol-(21) in 10 cc. of benzene. To this solution is added while stirring at 60° C. within 20 minutes a solution of 1.2 cc. of diketene in 15 cc. of benzene. After stirring the reaction mixture for a further 10 minutes at 60° C. it is cooled, washed with 2 N-hydrochloric acid and water, dried over sodium sulfate and evaporated to dryness under reduced pressure. To this dried oily residue (crude $\Delta^4$-pregnene-dione-(3,20)-ol-(21)-acetoacetate-(21)) is added 9 cc. of absolute methanol and 2.93 cc. of sodium methylate solution containing 71.3 mg. of sodium per cc. and the whole is heated while stirred for 10 minutes to 50° C. After a little while all components are dissolved. The solution is then filtered off by means of 2 N-hydrochloric acid and recrystallized from methylene chloride/methanol. The yield of $\Delta^4$-androstene-one-(3)-$\Delta,\alpha,\beta$-($\alpha$-acetyl) butenolide-(17) amounts to 3.15 grams. It melts at 235° C. (Kofler heater).

EXAMPLE 2

$\Delta^5$-androstene-ol-(3)-$\Delta,\alpha,\beta$-($\alpha$-acetyl)-butenolide-(17)

.64 cc. of freshly distilled acetoacetic ester are poured over 5.19 grams of $\Delta^5$-pregnene-diol-(3,21)-one-(20) and heated at the descending cooler for 4 hours under a pressure of about 150–200 mm. Hg on the steam bath. The mixture is then evaporated to dryness at first under reduced pressure and finally in the high vacuum at a bath temperature of 70° C. (duration 1 hour). The residue is suspended hot in about 25 cc. of acetone, cooled and the crystals are filtered off with suction. The crude product of $\Delta^5$-pregnene-diol-(3,21)-one-(20)-acetoacetate-(21) is recrystallized from the small amount of a mixture of methylene chloride and acetone. Melting point 190° C. (on the Kofler heater).

(a) 4.1 grams of $\Delta^5$-pregnene-diol-(3,21)-one-(20)-acetoacetate-(21) are suspended in 20 cc. of absolute methanol and mixed with 7.4 cc. of sodium-methylate solution (74.3 mg. of sodium per cc.). Dissolution sets in immediately. The reaction mixture is heated to boiling for another 25 minutes under reflux. After cooling it is acidified with 12.5 cc. of 2 N-hydrochloric acid, the crystals separated thereby are filtered off with suction, dried under reduced pressure and recrystallized from a mixture of acetone and ether. The yield of $\Delta^5$-androstene-ol-(3)-$\Delta,\alpha,\beta$-($\alpha$-acetyl)-butenolide-(17) amounts to 3.1 grams. Melting point, when heating slowly, 174° C. (on the Kofler heater).

(b) 5 cc. of methanol are poured over 0.35 g. of $\Delta^5$-pregnene-diol-(3,21)-one-(20)-acetoacetate-(21). After addition of 5 cc. of 2 N-sodium hydroxide solution dissolution sets in. This solution is heated to boiling for 25 minutes on the steam bath with reflux. It is then acidified with 5.5 cc. of 2 N-hydrochloric acid. The precipitate, which hereby separates, soon crystallizes and is then filtered off. After recrystallization from a mixture of acetone and ether 250 mg. of the $\Delta^5$-androstene-ol-(3)-$\Delta,\alpha,\beta$-($\alpha$-acetyl)-butenolide-(17) are obtained, melting at 174° C. (on the Kofler heater). The mixed melting point of the compound obtained according to (a) does not show any depression.

EXAMPLE 3

Androstane-one-(3)-$\Delta,\alpha,\beta$-($\alpha$-acetyl)-butenolide-(17)

4 grams of pregnane-dione-(3,20)-ol-(21) with 25 cc. of acetoacetic ester are heated in the oil bath for 20 hours at 110–115° C. Subsequently the mixture is concentrated to dryness in a high vacuum. The pregnane-dione-(3,20)-ol-(21)-acetoacetate-(21) is dissolved in 10 cc. of methanol and a sodium methylate solution containing 197 mg. of sodium is added. After some standing it is poured into 100 cc. of water. The pH value of the clear solution is adjusted to 5 by means of 2 N-acetic acid. The voluminous precipitate which is hereby separated is filtered off and recrystallized from acetone. Yield: 2.5 grams of androstane-one-(3)-$\Delta,\alpha,\beta$-($\alpha$-acetyl)-butenolide-(17), melting at 250–252° C.

EXAMPLE 4

$\Delta^4$-*androstene-dione-(3,11)-ol-(17α)-Δ,α,β-(α-acetyl)-butenolide-(17)*

3.7 grams of $\Delta^4$-pregnene-trione-(3,11,20)-diol-(17α,21) are dissolved hot in a mixture of 52 cc. of benzene and 52 cc. of freshly distilled acetoacetic ester and heated for 4 hours to slight boiling at a descending cooler under a nitrogen stream. Subsequently, the benzene is distilled off at 70° C. under reduced pressure (duration about 1 hour). The residue is introduced into 17 times its quantity of water. The excessive aceto-acetic ester is dissolved by means of a vibrating mixer and the crude $\Delta^4$-pregnene-trione-(3,11,20)-diol-(17α,21)-acetoacetate-21 crystallises out. The compound is filtered off with suction and dried at 56° C. in the high vacuum. The yield amounts to 3.99 grams; melting point 134–136° C. (on the Kofler heater).

3.99 grams of $\Delta^4$-pregnene-trione-(3,11,20)-diol-(17α,21)-acetoacetate-(21) are suspended in 90 cc. of absolute methanol and 2.71 cc. of sodium-methylate solution containing 208 mg. of sodium are added. The substance is spontaneously dissolved. After standing for 20 minutes at 30° C. under nitrogen any undissolved matter is filtered off. 100 cc. of 0.1 N-hydrochloric acid are added to the filtrate. After standing for a short period the $\Delta^4$-androstene-dione-(3.11)-ol-(17α)-Δ,α,β-(α-acetyl)-butenolide-(17) crystallizes out with exact melting point.

Melting point when slowly heating 180° C. (with decomposition) [on the Kofler heater]. The yield amounts to 2.2 grams. The substance can be recrystallized from hot acetone without alteration of the melting point.

EXAMPLE 5

$\Delta^4$-*androstene-one-(3)-Δ,α,β-(α-carboxyl)-butenolide-(17)*

6.6 grams of malonic acid ethyl ester semichloride in 40 cc. of benzene are dropwise added while stirring and cooling with ice to a solution of 13.2 grams of $\Delta^4$-pregnene-dione-(3,20)-ol-(21) in 100 cc. of benzene and 16 cc. of pyridine. The mixture is stirred for 30 minutes at room temperature. Subsequently it is heated to boiling for two hours with reflux on the steam bath. The reaction mixture is cooled, washed with water, then twice with dilute hydrochloric acid and again with water until it shows a neutral reaction. After drying over sodium sulfate the benzene is distilled off under reduced pressure. 18.1 grams of a residue $\Delta^4$-pregnene-dione-(3,20)-ol-(21)-malonic acid ethyl ester-(21) are obtained. 18.1 grams of $\Delta^4$-pregnene-dione-(3,20)-ol-(21) malonic acid ethyl ester-(21) are dissolved in 100 cc. of absolute methanol. 32 cc. of sodium methylate-solution (100 milligrams of sodium per cc.) are added to the solution. After allowing the solution to stand for 20 minutes at 30–40° C. 44 cc. of 2 N-hydrochloric acid are added, the mixture is sprinkled with about 200 cc. of water, whereby 8.5 grams of $\Delta^4$-androstene-one-(3)-Δ,α,β-(α-carboxyl)-butenolide-(17) crystallizes out. After recrystallization from 200 cc. of isopropyl alcohol it melts at 202–205° C.

EXAMPLE 6

$\Delta^4$-*androstene-one-(3)-Δ,α,β-(α-carboxyacetyl)-butenolide-(17)*

10 grams of $\Delta^4$-pregnene-dione-(3,20)-ol-(21) are dissolved in 240 cc. of α,α'-acetone-dicarboxylic acid ethyl ester. This solution is heated for 6 hours at 100° C. under reduced pressure and under an atmosphere of nitrogen. The unreacted acetone-dicarboxylic acid ethyl ester is distilled off under a pressure reduced to 0.05 mm. and at a temperature of the metal bath of 130° C. 13.6 grams of crude $\Delta^4$-pregnene-dione-(3,20)-ol-(21)-α,α'-acetone-dicarboxylic acid ethyl ester are obtained as residue.

7 grams of $\Delta^4$-pregnene-dione-(3,20)-ol-(21)-α,α'-acetone-dicarboxylic acid ethyl ester are dissolved in a mixture of 100 cc. of benzene and 100 cc. of petroleum ether. This mixture is adsorbed by a column of 5–15 cc. of aluminum oxide. After 2–3 hours the $\Delta^4$-androstene-one-(3)-Δ,α,β-(α-carboxyacetyl)-butenolide-(17) is eluted with a mixture of benzene and ethyl acetate (1:1). After removing the solvent by evaporation and recrystallization from methanol 2.5 grams of pure $\Delta^4$-androstene-one-(3)-Δ,α,β-(α-carboxyacetyl)-butenolide-(17) are obtained, melting at 153° C.

EXAMPLE 7

$\Delta^4$-*androstene-one-(3)-Δ,α,β-(α-butyryl)-butenolide-(17)*

6.6 grams of $\Delta^4$-pregnene-dione-(3,20)-ol-(21) are heated for 5 hours at 100° C. with 80 cc. of freshly distilled butyryl-acetic acid ethyl ester at the descending cooler under a pressure of about 100–150 mm. It is recommended to carry out the reaction in a nitrogen atmosphere. The reaction mixture is then evaporated to dryness in the high vacuum at a bath temperature of 100° C. 8.9 grams of distillation residue are thus obtained, which, without further purification, are immediately subjected to ring closure in order to obtain the butenolide. The crude ester is dissolved in 40 cc. of absolute methanol, and 5.5 cc. of sodium methylate solution (100 milligrams of sodium per cc.) are added. Spontaneous heating of the reaction mixture sets in. After having been allowed to stand for 15 minutes the reaction mixture is stirred into a mixture of 200 cc. of water and 8 cc. of 2 N-hydrochloric acid. The precipitate hereby separated is filtered off with suction and recrystallized from ethanol.

The yield of $\Delta^4$-androstene-one-(3)-Δ,α,β-(α-butyryl)-butenolide-(17) amounts to 5.7 grams; melting point 133–134° C.

EXAMPLE 8

$\Delta^4$-*androstene-one-(3)-Δ,α,β-(α-benzoyl)-butenolide-(17)*

6.6 grams of $\Delta^4$-pregnene-dione-(3,20)-ol-(21) are heated for 6 hours at 100° C. under a pressure of 100 mm. at the descending cooler with 70 cc. of benzoyl-acetic acid ethyl ester (freshly distilled). Subsequently the reaction mixture is freed in the high vacuum from excessive benzoyl-acetic acid ethyl ester at a bath temperature of 160° C. 10.65 grams of crude ester are thus obtained. The crude ester is dissolved in 100 cc. of absolute methanol and 5.5 cc. of sodium methylate solution (100 milligrams of sodium per cc.) are added. After standing for 15 minutes 10 cc. of 2 N-hydrochloric acid are added and stirred into 100 cc. of water. The precipitate hereby separating is filtered off with suction and recrystallized from methanol.

The yield of $\Delta^4$-androstene-one-(3)-Δ,α,β-(α-benzoyl)-butenolide-(17) amounts to 5.65 grams. It melts at 205° C.

EXAMPLE 9

$\Delta^4$-*androstene-one-(3)-Δ,α,β-(α-hydroxy-acetyl)-butenolide-(17)*

4.9 grams of $\Delta^4$-pregnene-dione-(3,20)-ol-(21) are heated in the oil bath with 8.5 grams of γ-acetoxy-acetoacetic ester at the descending cooler for 3½ hours under a pressure of 16 mm. to 125–130° C.

The mixture is then evaporated to dryness in a high vacuum. The crude pregnane-dione-(3,20)-ol-(21)-γ-acetoxy-aceto-acetate (melting at 115° C.) obtained is dissolved in 130 cc. of absolute methanol, and, while stirring, 7.05 cc. of sodium methylate solution containing 80 milligrams of sodium per cc. are added. After standing for 6 minutes at room temperature the mixture is heated for another 4 minutes at 60° C., then rapidly cooled, and 5.3 cc. of a mixture of methanol and water containing 0.05 cc. of water per cc. of methanol are added. After stirring for 3 minutes at room temperature 12.3 cc. of 2 N-hydrochloric acid are rapidly added. The mixture is sprinkled with water until crystallization sets in. After standing for some time and cooling with ice the crystals which have separated are filtered off with suction, washed with water and after drying recrystallized from methylene chloride/methanol. The yield of $\Delta^4$-androstene - one - (3) - $\Delta,\alpha,\beta$ - ($\alpha$-hydroxy-acetyl)-butenolide-(17) amounts to 5.01 grams; melting point 266° C. (on the Kofler heater). The $\gamma$-acetoxy-aceto-acetic acid ester can be prepared as follows:

260 grams of $\gamma$-bromaceto-acetic acid ester in a solution of 200 grams of potassium acetate are heated to boiling for 3½ hours with reflux in a mixture of 30 cc. of glacial acetic acid, 215 cc. of water, 850 cc. of acetone and 1000 cc. of ethanol. The acetone and the alcohol are removed by evaporation under reduced pressure. The residue is extracted twice with 200 cc. of ether each time. The combined ether extracts are shaken out twice with 100 cc. of water each time. After drying over sodium sulfate they are evaporated to dryness under reduced pressure. The oily residue is subjected to fractional distillation under a pressure of 0.3 mm. The $\gamma$-acetoxy-acetoacetic acid ester distills over at 96–98° C.

EXAMPLE 10

$\Delta^{1,4}$-androstane-diene-dione-(3,11)-ol-(17$\alpha$)-$\Delta,\alpha,\beta$-($\alpha$-acetyl)-butenolide-(17)

3 grams of $\Delta^{1,4}$-pregnadiene-trione - (3,11,20) - diol-(17$\alpha$,21) with 10 cc. of acetoacetic ester are heated in the oil bath for 5 hours at the descending cooler under a pressure of about 100–150 mm. to 110° C. Subsequently the mixture is evaporated to dryness, at first under reduced pressure and finally in a high vacuum. 30 cc. of absolute ethanol and 2.87 cc. of a sodium methylate solution containing 78.3 milligrams of sodium per cc. are added to the crude ester. The mixture is heated to boiling for 6 minutes with reflux on the oil bath while stirring, whereby all components are dissolved. The temperature is maintained at 50° C. for another 7 minutes. The solution is rapidly cooled, weakly acidified with dilute hydrochloric acid and sprinkled with a little water until crystallization sets in. After some standing and cooling with ice the separated crystals are filtered off and recrystallized from methylene chloride/methanol. The yield of $\Delta^{1,4}$-androstane-diene-dione-(3,11)-ol-(17$\alpha$)-$\Delta,\alpha,\beta$ ($\alpha$-acetyl)-butenolide-(17) amounts to 2.04 grams. Melting point 225–226° C. with decomposition (on the Kofler heater).

We claim:

1. The compound of the formula

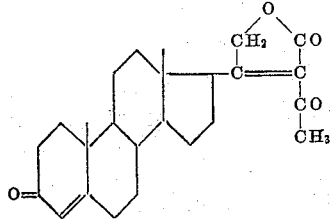

2. The compound of the formula

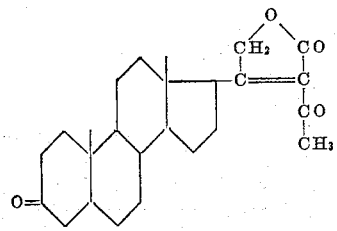

3. The compound of the formula

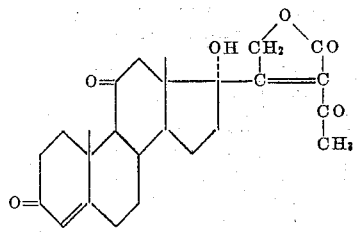

4. The compound of the formula

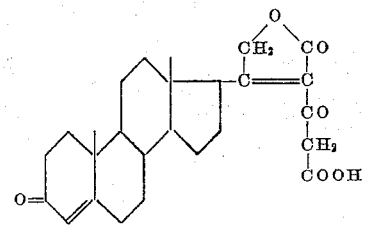

5. The compound of the formula

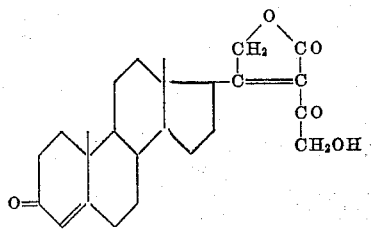

6. A compound of the group consisting of $\alpha,\beta$-butenolides of the general formula

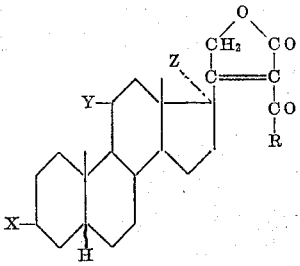

and their $\Delta^4$, $\Delta^{5(6)}$ and $\Delta^{1,4}$ unsaturated analogs wherein X is selected from the group consisting of hydroxy and keto groups, Y is selected from the group consisting of hydrogen, hydroxy groups and keto groups, Z is selected from the group consisting of hydrogen and hydroxy groups, and R is selected from the group consisting of hydroxy, alkyl, hydroxyalkyl, carboxyalkyl and phenyl, the alkyl groups of which contain from one to three carbon atoms.

7. The process for preparing a compound of the group consisting of $\alpha,\beta$-butenolides of the general formula

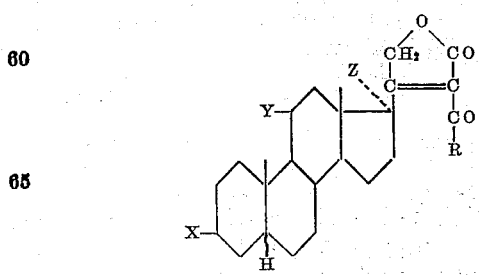

and their $\Delta^4$, $\Delta^{5(6)}$ and $\Delta^{1,4}$ unsaturated analogs wherein X is selected from the group consisting of hydroxy and keto groups, Y is selected from the group consisting of hydrogen, hydroxy groups and keto groups Z, is selected from the group consisting of hydrogen and hydroxy groups, and R is selected from the group consisting of hydroxy, alkyl, hydroxyalkyl, carboxyalkyl and phenyl, the alkyl groups of which contain from one to three carbon atoms, which comprises reacting, with a basic condensing agent in an organic solvent at a temperature between 20 and 100° C., a compound of the group consisting of

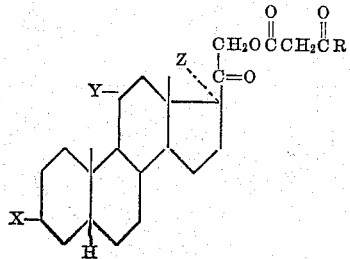

and the $\Delta^4$, $\Delta^{5(6)}$ and $\Delta^{1,4}$ unsaturated analogs thereof, wherein X, Y, Z and R are as defined above.

References Cited in the file of this patent

UNITED STATES PATENTS

| | | |
|---|---|---|
| 2,361,964 | Ruzicka et al. | Nov. 7, 1944 |
| 2,361,967 | Ruzicka | Nov. 7, 1944 |
| 2,693,484 | Cummings et al. | Nov. 2, 1954 |

FOREIGN PATENTS

| | | |
|---|---|---|
| 153,918 | Great Britain | Feb. 13, 1922 |

OTHER REFERENCES

Beilstein: "Handbuch der Organischen Chemie," vol. 3, 2nd addition, page 516, No. 2, item 2.